(12) United States Patent
Charopoulos et al.

(10) Patent No.: US 10,946,389 B2
(45) Date of Patent: Mar. 16, 2021

(54) ACTIVATION DEVICE WITH MAGNETS

(71) Applicant: Vorwerk & Co. Interholding GmbH, Wuppertal (DE)

(72) Inventors: Philipp Charopoulos, Duesseldorf (DE); Felix Thies, Wuppertal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 239 days.

(21) Appl. No.: 16/208,922

(22) Filed: Dec. 4, 2018

(65) Prior Publication Data

US 2019/0167042 A1 Jun. 6, 2019

(30) Foreign Application Priority Data

Dec. 5, 2017 (DE) .................... 10 2017 128 820.1

(51) Int. Cl.
| | |
|---|---|
| *A47J 43/00* | (2006.01) |
| *B02C 25/00* | (2006.01) |
| *G05G 1/08* | (2006.01) |
| *H01H 25/06* | (2006.01) |
| *H01H 36/00* | (2006.01) |

(Continued)

(52) U.S. Cl.
CPC .......... *B02C 25/00* (2013.01); *A47J 43/0705* (2013.01); *A47J 43/0761* (2013.01); *A47J 43/0794* (2013.01); *G05G 1/08* (2013.01); *H01H 25/06* (2013.01); *H01H 36/00* (2013.01); *H01H 19/06* (2013.01); *H01H 19/11* (2013.01); *H01H 19/14* (2013.01); *H01H 19/20* (2013.01); *H01H 19/62* (2013.01); *H01H 2231/012* (2013.01)

(58) Field of Classification Search
CPC ....... B02C 25/00; B02C 18/18; B02C 18/182; B02C 18/186; A47J 43/0794; A47J 43/94; G05G 1/08; H01H 25/06
See application file for complete search history.

(56) References Cited

U.S. PATENT DOCUMENTS

| | | | | |
|---|---|---|---|---|
| 3,109,906 | A * | 11/1963 | Abendroth | H01H 25/06 335/179 |
| 5,187,630 | A * | 2/1993 | MacKay | G05G 1/08 200/565 |

(Continued)

FOREIGN PATENT DOCUMENTS

EP 0 430 612 A2 6/1991

*Primary Examiner* — Faye Francis
(74) *Attorney, Agent, or Firm* — Collard & Roe, P.C.

(57) ABSTRACT

An activation device for transmitting a user input to a control device has an engaging element that forms a first housing part and a feeding element that forms a second housing part. The engaging element has a push magnet, whose magnetic field extends into the feeding element and the feeding element has a push magnet that can be displaced without contact through exposure to the magnetic field. The engaging push magnet can be displaced in the direction of the feeding element by pressure-activating the activation device, and is set up to exert a magnetic force on a corresponding feeding push magnet. The engaging element and feeding element each have at least one rotating magnet that can be displaced parallel to an intermediate plane running between them. The engaging rotating magnet of the engaging element exerts a magnetic force on a corresponding feeding rotating magnet of the feeding element.

10 Claims, 3 Drawing Sheets

(51) Int. Cl.
    *A47J 43/07*     (2006.01)
    *H01H 19/11*     (2006.01)
    *H01H 19/62*     (2006.01)
    *H01H 19/14*     (2006.01)
    *H01H 19/06*     (2006.01)
    *H01H 19/20*     (2006.01)

(56) References Cited

U.S. PATENT DOCUMENTS

| | | | | |
|---|---|---|---|---|
| 5,852,968 | A * | 12/1998 | Sundquist | A47J 43/06 99/492 |
| 5,867,082 | A * | 2/1999 | Van Zeeland | G01D 5/06 200/521 |
| 7,229,036 | B2 * | 6/2007 | Carnevale | A47J 43/0772 241/101.3 |
| 9,145,666 | B2 * | 9/2015 | Hammer | B02C 18/0092 |
| 2007/0210194 | A1 * | 9/2007 | Carnevale | A47J 43/0772 241/92 |
| 2008/0196541 | A1 * | 8/2008 | Kramlich | G05G 1/10 74/553 |
| 2010/0246319 | A1 * | 9/2010 | Pryor, Jr. | A47J 43/0766 366/205 |
| 2015/0288362 | A1 * | 10/2015 | Lee | H03K 17/97 200/4 |
| 2016/0030900 | A1 * | 2/2016 | Jin | A47J 31/00 261/141 |
| 2016/0334830 | A1 * | 11/2016 | Sirohiwala | G05G 1/04 |
| 2018/0166235 | A1 * | 6/2018 | Merminod | G06F 3/0383 |
| 2018/0308649 | A1 * | 10/2018 | Kubes | G05G 5/03 |
| 2018/0315560 | A1 * | 11/2018 | Hu | H01H 25/06 |

\* cited by examiner

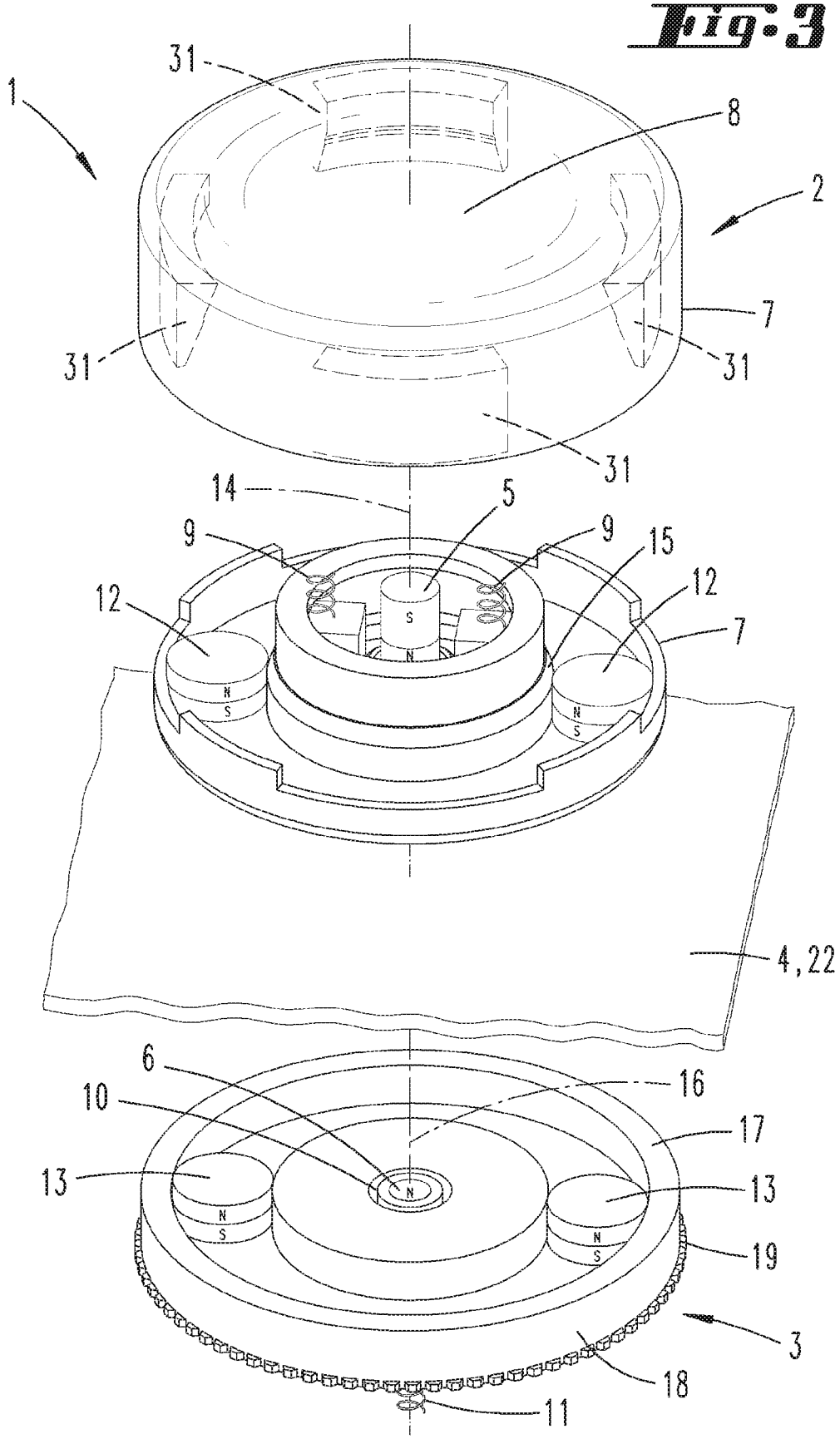

ACTIVATION DEVICE WITH MAGNETS

CROSS REFERENCE TO RELATED APPLICATIONS

Applicant claims priority under 35 U.S.C. § 119 of German Application No. 10 2017 128 820.1 filed on Dec. 5, 2017, the disclosure of which is incorporated by reference.

BACKGROUND OF THE INVENTION

1. Field of the Invention

The invention relates to an activation device for transmitting a user input to a control device, wherein the activation device has an engaging element that forms a first housing part of the activation device and a feeding element that forms a second housing part of the activation device, wherein the engaging element has a magnet, whose magnetic field extends into the feeding element, wherein the feeding element has a magnet that can be displaced without contact through exposure to the magnetic field, wherein the engaging element has an engaging push magnet, which can be displaced in the direction of the feeding element by pressure-activating the activation device, and is set up to exert a magnetic force on a corresponding feeding push magnet of the feeding element that can be displaced in the same or an opposite direction.

In addition, the invention relates to an electric motor-driven food processor with a base device having a device housing, which has an activation device for transmitting a user input to a control device of the food processor.

2. Description of the Related Art

Activation devices of the aforementioned kind are known in prior art, among other things also for electric motor-driven food processors.

Such an activation device functions through the effect of magnetic forces, which emanate from corresponding magnets within separate partial regions of the activation device. Because the activation devices use magnetic forces, the activation device does not have to pass through the device housing. This eliminates the need for an opening, for example through an aperture of an electric motor-driven food processor. As a result, the device surface can be cleaned better, and dust, dirt, liquid and the like are prevented from entering into the device housing.

For example, publication EP 0 430 612 A2 discloses an activation device having an adjustment knob that can be turned via a shaft arranged outside of a housing, wherein a movement of the adjustment knob can be transferred to a component arranged inside of the housing through exposure to magnetic forces. The adjustment knob and the component are designed as circular, elliptical or polygonal plates, and stand one opposite the other, separated by a wall of the housing. The component and the adjustment knob carry corresponding magnets, which can transfer a rotational movement of the adjustment knob to the component.

Even though such magnetic activation devices have proven effective in rotary buttons, they do not make it possible to transmit an input by pressing a button, for example as is possible in switches or combined push-turn activation devices.

SUMMARY OF THE INVENTION

Therefore, proceeding from the aforementioned prior art, the object of the invention is to create a magnetically operating activation device that permits the transmission of a pressure input by a user.

In order to achieve this object, the engaging element and feeding element of the activation device each has at least one magnet that can be displaced parallel to an intermediate plane running between them, wherein an engaging rotating magnet of the engaging element is set up to exert a magnetic force on a corresponding feeding rotating magnet of the feeding element. This additional implementation of corresponding rotating magnets inside of the engaging element and feeding element provides the activation device with an additional rotating function, which aside from a pressure activation can also detect a rotating activation of the activation device. As a consequence, the activation device has at least one additional pair of magnets, which can transmit a rotation of the engaging element to the feeding element. In particular, it is recommended that several such magnet pairs be provided so as to ensure the transmission of the magnetic force. While the use of two, three or four magnet pairs is especially preferred, it is also possible to use even more magnet pairs. The corresponding rotating magnets of the engaging element and feeding element also ensure an optimal positioning and fixation of the engaging element on a device having the intermediate plane, for example so that the engaging element can be removed from the device for cleaning purposes, and when it is again replaced finds its way back to the optimal position on the intermediate plane through exposure to the magnetic forces of the magnet pairs. The magnetic attraction of the corresponding rotating magnets produces a static friction between the engaging element and the device housing. In order to ensure a stronger positioning of the engaging element, a positive connection can also be provided, for example in the form of a depression or elevation on the device housing, with which a corresponding mating piece of the engaging element can mechanically interact. The corresponding engaging rotating magnets and feeding rotating magnets mutually attract each other, so that given a displacement of an engaging rotating magnet in a plane parallel to the intermediate plane, an appropriate movement of the corresponding feeding rotating magnet also takes place.

The activation device has corresponding magnets that can be displaced orthogonally to an intermediate plane running between the engaging element and feeding element, and which magnetically interact with each other. For example, the magnets of such a magnet pair are arranged in such a way as to repel each other while approaching. When the activation device is activated, a magnet of the engaging element, i.e., the engaging push magnet, is initially displaced, and its magnetic field repels the magnet arranged in the feeding element, i.e., the feeding push magnet. The displacement of the feeding push magnet can be detected by a sensor, so that an activation of the activation device is recognized. For example, the sensor can be a position sensor or contact sensor. The displacement of the feeding push magnet is preferably accompanied by the displacement of a pin immovably connected therewith indirectly or directly, which closes a corresponding counter-contact of an encoder. Use can alternatively also be made of other sensors for evaluating the displacement position of the feeding push magnet, which function based upon optical, electronic or mechanical measuring methods.

The engaging element can have an engaging element housing with a displaceable feeding element pressure area, which is set up to displace the feeding push magnet in the direction of the feeding element. For example, the displaceable engaging element pressure area of the engaging element can be a partial area of a displaceable cover element, which relative to an adjacent partial area of the engaging element can be pressed in the direction of the feeding element. While moving, for example, the engaging element pressure area can impact an engaging push magnet mounted in the engaging element, and displace the latter in the direction of the feeding element, so that its magnetic field can act on the feeding push magnet, i.e., also displace the latter.

In this connection, the engaging push magnet can be immovably arranged on the engaging element pressure area. In this configuration, the engaging element pressure area itself carries the engaging push magnet, so that a displacement of the engaging push magnet automatically also takes place given a displacement of the engaging element pressure area. In particular, the engaging push magnet can be fixedly connected with a movable cover element of the engaging element.

In addition, the engaging element pressure area can have allocated to it a spring element, whose restoring force is directed away from the feeding element as viewed from the pressed engaging element pressure area, so that the engaging element pressure area is displaced away from the feeding element when the pressure activation of the activation device is discontinued. In order to displace the engaging element pressure area of the feeding element, the restoring force of the spring element must be overcome. As soon as the engaging element pressure area has been released, the restoring force works in the opposite direction, and displaces the engaging element pressure area back into the initial position. This configuration allows the activation device to preferably be designed like a kind of switch.

The feeding element can have a feeding element pressure area that has the feeding push magnet, and can be displaced away from the engaging element. The feeding element pressure area carries the feeding push magnet, and can be designed like a pin, for example, which is designed to close a contact of an encoder in the position displaced away from the engaging element. The displacement of the feeding element pressure area is preferably guided, for example in a structure of a feeding element housing designed as a slotted guide.

In this conjunction, the feeding element pressure area can have allocated to it a spring element, whose restoring force is directed in the direction of the engaging element, so that the feeding element pressure area is displaced in the direction of the engaging element when a pressure activation of the activation device is discontinued. After the activation device has been activated, the restoring force of the spring element tries to press the feeding element pressure area back into an initial position corresponding to a position near the engaging element. In a non-activated state of the activation device, the restoring force of the spring element is greater than a repelling effect between the corresponding magnets of the engaging element and feeding element, for example. However, when the activation device is activated, and the engaging element thus displaces the engaging push magnet in the direction of the feeding element, the distance between the engaging push magnet and feeding element decreases, so that the feeding push magnet located on the other side of an intermediate plane is displaced away from the feeding element against the restoring force of the spring element allocated to it. The feeding element pressure area carrying the feeding push magnet is thus displaced into a new equilibrium position, which can be detected by an encoder. As soon as the engaging element pressure area has again been released by a user, the restoring force of the spring element can displace the feeding element pressure area along with the feeding push magnet back into the preferred position. As an alternative, it would also be possible for the corresponding push magnets of the engaging element and feeding element to not mutually repel, but rather attract each other, so that a displacement of the feeding push magnet in the direction of the engaging element takes place given a displacement of the engaging push magnet in the direction of the feeding element. In order to return the feeding push magnet into the initial position, the spring element would thus have to be arranged in such a way that it tries to space the feeding push magnet apart from the engaging element if the restoring force exceeds the attracting force of the corresponding push magnets.

The engaging element can have a rotational axis oriented orthogonally to the intermediate plane and an engaging element rotating area that can be rotated around the rotational axis and has the engaging rotating magnets, and/or that the feeding element have a rotational axis oriented orthogonally to the intermediate plane and a feeding element rotating area that can rotate around the rotational axis and has the feeding rotating magnet. The engaging element housing or feeding element housing incorporates a rotational axis that is oriented orthogonally to the intermediate plane in relation to the assembled state of the activation device, around which the engaging element rotating area or feeding element rotating area can rotate. For example, the rotating axis can stand on the intermediate plane via a corresponding partial housing area, i.e., an interspersed partial area of a device housing. If a user of the activation device rotates a partial area of the feeding element housing relative to the intermediate plane, a rotation of the engaging element rotating area takes place simultaneously. The partial area of the engaging element housing and engaging element rotating area can be configured as one part or be immovably joined together, or be configured as separate parts, for example wherein a partial area of the engaging element housing that a user rotates during the rotational activation of the activation device acts on an engaging element rotating area, for example by the partial area pushing the engaging element rotating area ahead of itself in the rotational direction. Depending on the configuration of the engaging element housing, this can be advantageous, in particular for separating the engaging element pressure area and engaging element rotating area from each other in terms of their mechanical effect. The feeding element rotating area of the feeding element can be a part of the feeding element arranged in the feeding element housing, since it need not be in active contact with the housing of the feeding element. In addition, an encoder allocated to the feeding element rotating area is also located inside of the feeding element housing. A partial area of the feeding element housing need not be rotatable.

The engaging element rotating area and/or the feeding element rotating area can be rotatably mounted disk bodies. These disk bodies can each accommodate one or several magnets, which each correspond with a magnet of the opposing feeding element or engaging element.

A circumferential surface of the feeding element rotating area can have a structure that continues in the circumferential direction for engaging a contact element of a rotation sensor. For example, if the feeding element rotating area is a disk body, the structure is annularly formed on the circumferential surface of the disk body. A rotation sensor of the activation device or a device having the activation device can have a spring-loaded contact element, for example, which engages into the structure, and thereby generates haptic feedback about the rotational activation for the user. The contact element can preferably be part of a rotating encoder of the activation device or the device that evaluates the rotational movement for determining the user input.

Finally, apart from the activation device described above, the invention also proposes an electric motor-driven food processor with a base device that has a device housing, and comes with an activation device for transmitting a user input to a control device of the food processor, wherein the activation device is designed according to one of the previously described embodiments, and wherein the intermediate plane running between the engaging element and feeding element is a partial area of the device housing. The feeding element of the food processor is preferably immovably installed inside of the base device, while a user of the food processor can separate the corresponding outer engaging element from the base device, for example for cleaning the housing surface of the base device.

For example, an electric motor-driven food processor within the meaning of the invention can be a combined cooking/mixing device, which has a base device and a preparation vessel that can be connected with the base device. For example, the preparation vessel can have a floor opening in a floor area, through which a partial area of an agitator mount can be passed, so as to connect a rotating shaft with a motor shaft of an electric motor of the base device. In particular in conjunction with a menu guide shown on a display of the base device, the activation device can be used for selecting recipes, confirming inputs or the like.

BRIEF DESCRIPTION OF THE DRAWINGS

The invention will be explained in more detail below based on exemplary embodiments. In the drawings:

FIG. 3 is an exploded view of the activation device.

DETAILED DESCRIPTION OF THE PREFERRED EMBODIMENTS

Figure 1:
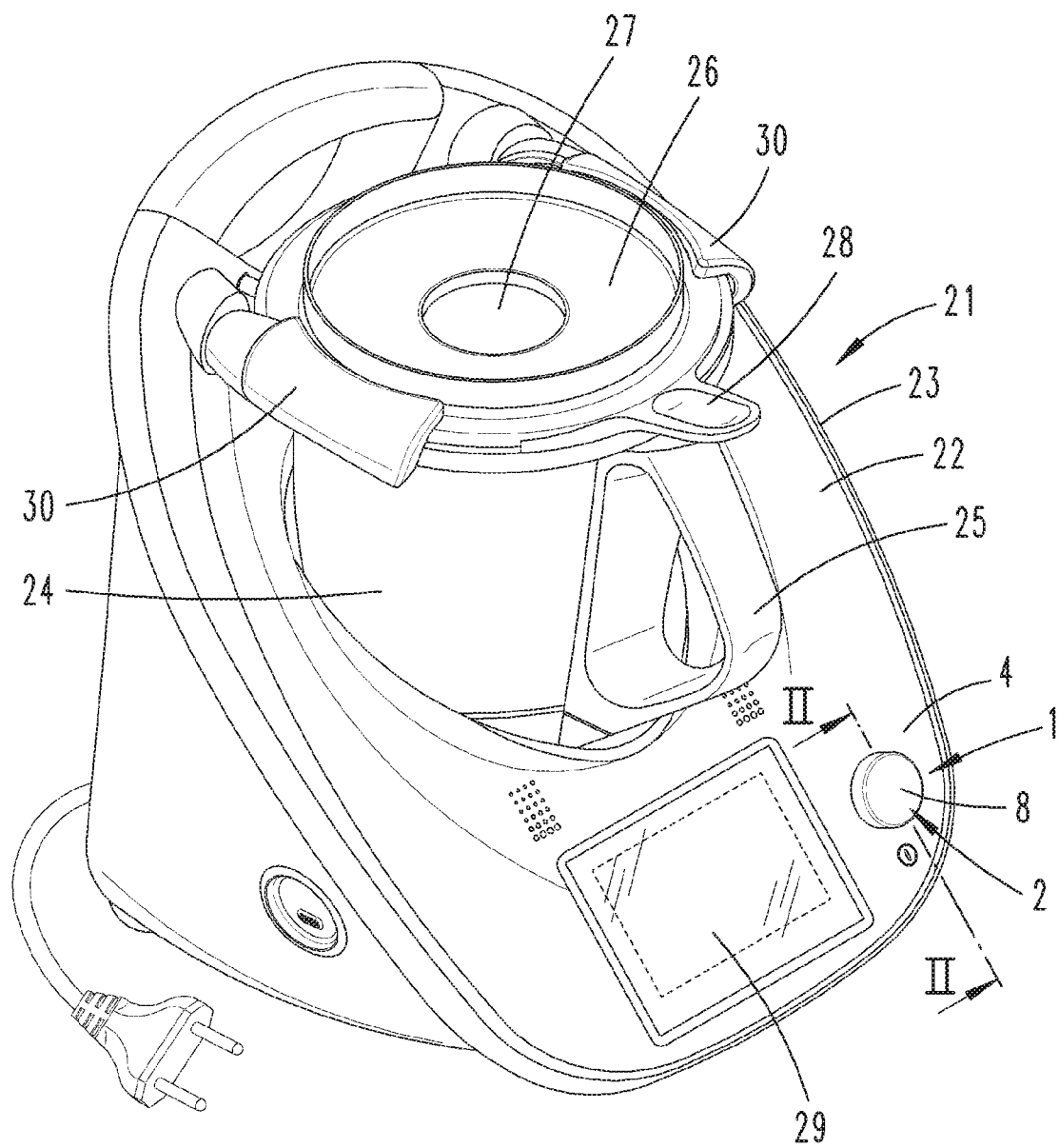
FIG. 1 is an electric motor-driven food processor according to the invention.

FIG. 1 shows an example of an electric motor-driven food processor 21, which is here configured like a combined cooking/mixing device. The food processor 21 has a base device 23 with a device housing 22. A preparation vessel 24 is detachably connected with the base device 23. A floor area of the preparation vessel 24 has a floor opening (not shown), through which a partial area of an agitator mount (not shown) can be passed, so as to be connected with a motor shaft of an electric motor of the food processor 21. The preparation vessel 24 has a handle 25 and a cover 26 with a cover opening 27. During operation of the food processor 21, ingredients can be added to the preparation vessel 24 through the cover opening 27, for example. The cover 26 further has a cover handle 28. Also arranged on the base device 23 are a display 29 (for example, here a touchscreen) and an activation device 1, with which a menu guide of the food processor 21 can be controlled, for example so as to control the preparation of meals based on a selected recipe. For example, the display 29 can show the user individual processing steps in an automatic recipe preparation, along with required ingredients for the preparation, which the user must add to the preparation vessel 24. For example, the user can utilize the activation device 1 to confirm an input, start individual processing steps and the like. The cover 26 of the preparation vessel 24 is fixed to the preparation vessel 24 with the help of two locking rollers 30, so that the preparation vessel 24 cannot be inadvertently opened during operation of the food processor 21.

Figure 2:
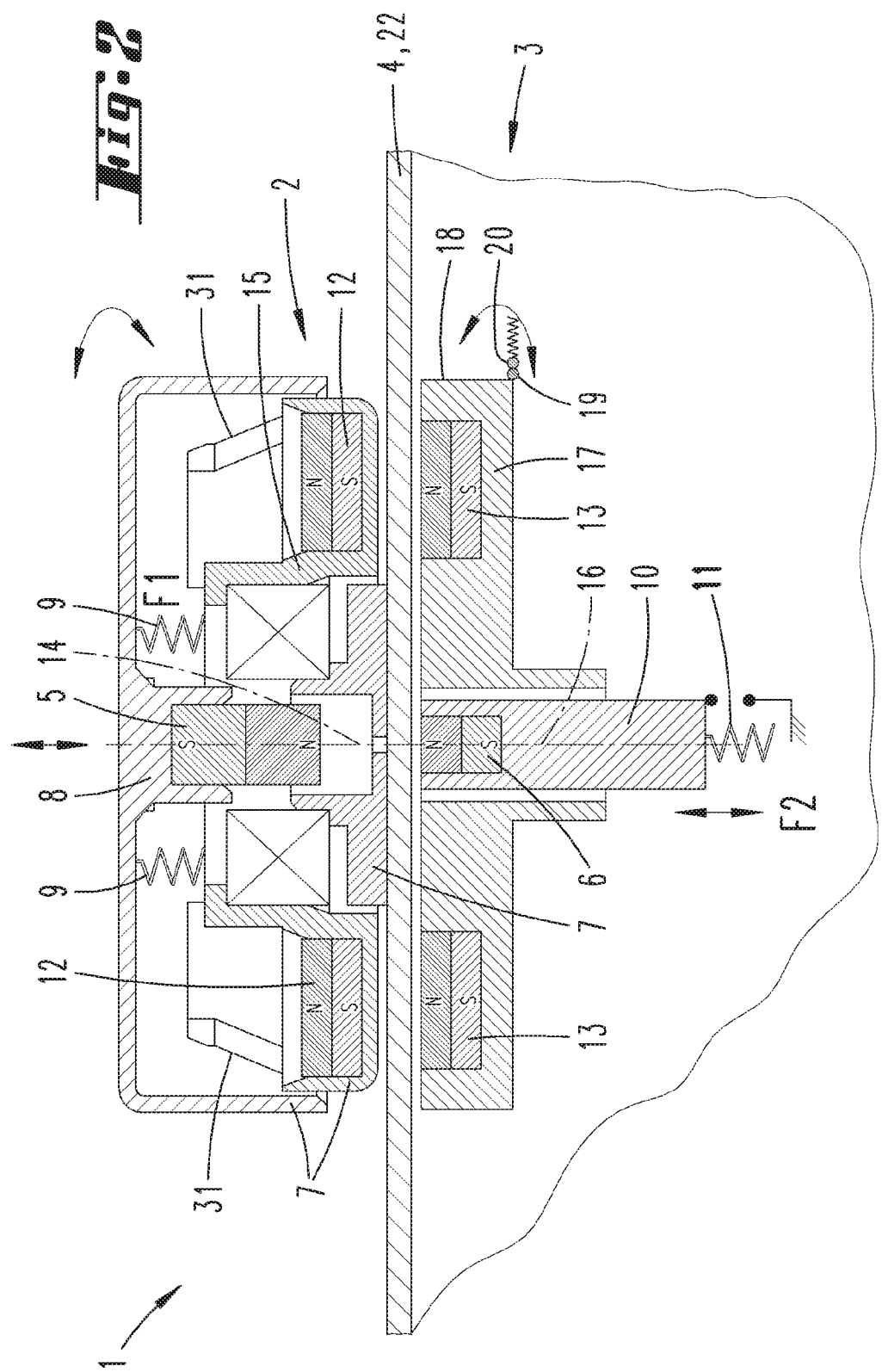
FIG. 2 is a sectional view of an activation device according to the invention.

The activation device 1 is here designed as a rotary pushbutton, which permits user inputs both by pressing and rotating the activation device 1. FIGS. 2 and 3 show the activation device 1 in detail, wherein a partial area of the device housing 22 of the food processor 21 is depicted as a respective intermediate plane 4.

The activation device 1 has an engaging element 2 located outside of the device housing 22 and a feeding element 3 formed inside of the device housing 22. The engaging element 2 and feeding element 3 are separated by the intermediate plane 4, which is part of the device housing 22. The activation device 1 does not penetrate the intermediate plane 4; rather, the engaging element 2 and feeding element 3 are connected with each other by engaging rotating magnets 12 of the engaging element 2 and feeding rotating magnets 13 of the feeding element 3, which expose each other to mutually attracting magnetic forces. A north pole (N) of a feeding rotating magnet 13 here lies opposite a respective south pole (S) of an engaging rotating magnet 12, so that the latter attract each other, and in so doing keep the engaging element 2 on the intermediate plane 4 or the feeding element 3 lying behind it. In addition, the intermediate plane 4 and engaging element 2 can also have corresponding shaping elements, for example depressions and elevations. However, this is not depicted here. For example, the feeding element 3 is here a constituent of the base device 23 of the food processor 21, and preferably fixedly secured to the device housing 22 from inside.

For example, the activation device 1 here has two magnet pairs each comprised of an engaging rotating magnet 12 and a feeding rotating magnet 13, even though additional magnet pairs can here also be used. It is basically possible that the activation device 1 also just have a single magnet pair comprised of an engaging rotating magnet 12 and a feeding rotating magnet 13. However, it is then recommended that additional fastening means be provided for the engaging element 2 on the intermediate plane 4.

The engaging element 2 has an engaging element housing 7, which has an engaging element pressure area 8 that can be displaced relative to other housing parts of the engaging element 2. A spring element 9 is allocated to the engaging element pressure area 8, and its restoring force is directed against the direction of a pressure activation of the engaging element 2. In the initial position shown on FIG. 2, the spring element 9 is relaxed. The engaging element pressure area 8 has an engaging push magnet 5, which during the displacement of the engaging element pressure area 8 in the direction of the intermediate plane 4 is also displaced. The magnetic field of the engaging push magnet 5 here acts on a corresponding feeding push magnet 6 of the feeding element 3, which is displaced away from the intermediate plane 4 by a repelling magnetic effect. The feeding push magnet 6 is once again part of a feeding element pressure area 10, which is displaceably mounted inside of the feeding element 3. A spring element 11 is once again allocated to this feeding element pressure area 10, and its restoring force is directed in the direction of the intermediate plane 4. During a displacement of the engaging push magnet 5 of the engaging element 2 in the direction of the intermediate plane 4, the magnetic field penetrates the engaging push magnet 5 of the feeding element 3 until the repelling effect acts on the feeding push magnet 6 of the feeding element 3, and displaces it away from the intermediate plane 4 against the restoring force of the spring element 11 allocated thereto. This displacement position can be detected by a sensor allocated to the feeding element pressure area 10. As a consequence, a control device of the food processor 21 can detect a corresponding user input. For example, the feeding element pressure area 10 can carry a contact pin, which closes a contact of the sensor located in the feeding element 3 or the base device 23 of the food processor 21.

In a non-activated state of the activation device 1, a spring force of the spring element 9 allocated to the engaging element 2 outweighs the repelling force of the engaging push magnet 5 and feeding push magnet 6, which lie opposite each other with the same poles. When the user activates the activation device 1 by pressing the engaging element pressure area 8 in the direction of the intermediate plane 4, the poles are moved toward each other, and the repelling force rises until the restoring force of the spring element 11 allocated to the feeding element 3 can be overcome. As a result, the feeding element pressure area 10 that carries the feeding push magnet 6 is displaced away from the intermediate plane 4. If the user again releases the engaging element pressure area 8, the restoring force of the spring element 11 displaces the feeding push magnet 6 back into the initial position lying on the intermediate plane 4. The repelling magnetic force also displaces the engaging push magnet 5 back into the initial position shown on FIG. 2 again, wherein the spring force of the spring element 9 allocated to the engaging element pressure area 8 acts as an additional restoring force.

The engaging element housing 7 of the engaging element 2 further has an engaging element rotating area 15, which is mounted so that it can rotate around a rotational axis 14. The rotational axis 14 is part of an additional partial area of the engaging element housing 7, which is in contact with the intermediate plane 4. The engaging element rotating area 15 can be rotated around the rotational axis 14 by rotating the engaging element pressure area 8 around the rotational axis 14. To this end, the engaging element pressure area 8 has inwardly facing rotating wings 31, whose rotational path is overlapped by a rotational path of the engaging element rotating area 15, so that the rotating wings 31 can push the engaging element rotating area 15 ahead of themselves. Given a rotation of the engaging element rotating area 15, the engaging rotating magnets 12 arranged thereon simultaneously rotate. The magnetic field of the engaging rotating magnets 12 is displaced as a result. The magnetic field of the engaging rotating magnets 12 penetrates the intermediate plane 4, and engages into a plane of the feeding element 3, within which the feeding rotating magnets 13 are located. The feeding rotating magnets 13 are fastened to a feeding element rotating area 17 of the feeding element 3, which can rotate around the rotational axis 16. If a user turns the engaging element pressure area 8 around the rotational axis 14 in order to displace the engaging rotating magnets 12, the feeding rotating magnets 13 of the feeding element 3 are exposed to changing magnetic fields. The opposite polarization of the engaging rotating magnets 12 and feeding rotating magnets 13 cause the feeding rotating magnets to also be displaced during the rotation of the engaging element rotating area 15, so that the feeding element rotating area 17 that carries the feeding rotating magnets 13 also rotates.

The circumferential surface 18 of the feeding element rotating area 17 has a structure 19 into which a contact element 20 of a sensor engages. The contact element 20 can be spring-loaded and press against the circumferential surface 18, for example so that peaks and valleys of the structure 19 can be overcome. The structure 19 is used to provide the user of the activation device 1 with haptic feedback about his or her rotational activation. In addition, the contact element 20 can also be part of a rotary encoder, which detects a rotational position of the feeding element rotating area 17. Depending on the selected rotational position, i.e., the angular range of the rotational activation, a control device of the food processor 21 can infer the content of a user command, for example a selected temperature for a heating device, a speed range for an agitator of the food processor 21 and the like.

REFERENCE LIST

1 Activation device
2 Engaging element
3 Feeding element
4 Intermediate plane
5 Engaging push magnet
6 Feeding push magnet
7 Engaging element housing
8 Engaging element pressure area
9 Spring element
10 Feeding element pressure area
11 Spring element
12 Engaging rotating magnet
13 Feeding rotating magnet
14 Rotational axis
15 Engaging element rotating area
16 Rotational axis
17 Engaging element rotating area
18 Circumferential surface
19 Structure
20 Contact element
21 Food processor
22 Device housing
23 Base device
24 Preparation vessel
25 Handle
26 Cover
27 Cover opening
28 Cover handle
29 Display
30 Locking roller
31 Rotating wing

What is claimed is:

1. An activation device for transmitting a user input to a control device, the activation device being configured as a rotary pushbutton by which the user input is transmitted by both pressing and rotating the activation device, wherein the activation device comprises:
   an engaging element configured for receiving the user input from a user, the engaging element forming a first housing part of the activation device, the engaging element comprising an engaging push magnet and an engaging rotating magnet, and
   a feeding element configured to receive the user input from the engaging element and transmit the user input to the control device, the feeding element forming a second housing part of the activation device, wherein the feeding element comprises a feeding push magnet and a feeding rotating magnet, wherein the feeding push magnet and feeding rotating magnet are configured to communicate with the engaging push magnet and engaging rotating magnet by magnetic forces, wherein the engaging push magnet is configured to be displaced in a direction of the feeding element by pressure-activating the activation device, wherein the engaging push magnet is configured to exert a magnetic force on the feeding push magnet to displace the feeding push magnet in a same or an opposite direction as the displacement of the engaging push magnet without contact with the engaging push magnet, and wherein the engaging rotating magnet is set up to exert a magnetic force on the feeding rotating magnet such that the rotating magnets are configured to be displaced parallel to an intermediate plane running between them.

2. The activation device according to claim 1, wherein the engaging element has an engaging element housing with a displaceable engaging element pressure area, which is set up to displace the engaging push magnet in the direction of the feeding element.

3. The activation device according to claim 2, wherein the engaging push magnet is immovably arranged on the engaging element pressure area.

4. The activation device according to claim 2, further comprising a spring element allocated to the engaging element pressure area, the spring element having a restoring force that is directed away from the feeding element viewed from the engaging element pressure area in a pressed state, so that the engaging element pressure area is displaced away from the feeding element when pressure activation of the activation device is discontinued.

5. The activation device according to claim 1, wherein the feeding element has a feeding element pressure area that contains the feeding push magnet, and which is configured to be displaced away from the engaging element.

6. The activation device according to claim 5, further comprising a spring element allocated to the feeding element pressure area, the spring element having a restoring force directed in a direction of the engaging element, so that the feeding element pressure area is displaced in the direction of the engaging element when a pressure activation of the activation device is discontinued.

7. The activation device according to claim 1, wherein the engaging element has a rotational axis oriented orthogonally to the intermediate plane and an engaging element rotating area that is configured to be rotated around the rotational axis and has the engaging rotating magnets, and/or wherein the feeding element has a rotational axis oriented orthogonally to the intermediate plane and a feeding element rotating area that can rotate around the rotational axis and has the feeding rotating magnet.

8. The activation device according to claim 7, wherein the engaging element rotating area and/or the feeding element rotating area are rotatably mounted disk bodies.

9. The activation device according to claim 7, wherein a circumferential surface of the feeding element rotating area has a structure that continues in the circumferential direction for engaging a contact element of a rotation sensor.

10. An electric motor-driven food processor with a base device that has a device housing, and an activation device according to claim 1 for transmitting a user input to a control device of the food processor, wherein the intermediate plane running between the engaging element and feeding element is a partial area of the device housing.

* * * * *